UNITED STATES PATENT OFFICE.

JACINTO MITATS, OF RIPOLLET, SPAIN.

ARTIFICIAL MARBLE.

No. 928,061.     Specification of Letters Patent.     Patented July 13, 1909.

Application filed October 21, 1907. Serial No. 398,515.

*To all whom it may concern:*

Be it known that I, JACINTO MITATS, a citizen of Spain, residing at Ripollet, in the Province of Barcelona and Kingdom of Spain, have invented certain new and useful Improvements in Artificial Marble; and I do hereby declare the following to be a full, clear, and exact description of the invention, such as will enable others skilled in the art to which it appertains to make and use the same.

My invention relates to improvements in artificial marble, and the object of my invention is to produce a composition which will closely simulate marble in appearance and be superior to the same in hardness and wearing qualities.

The artificial stone made by me contains the following ingredients:—

| | |
|---|---|
| Portland cement | 750 parts |
| Marble dust | 125 parts |
| River or sea sand | 450 parts |
| Mineral color, (of any desired shade) | 25 parts |
| Water | 200 parts |

The first four named materials are thoroughly ground and mixed together, the water added, the mixing continued, and the whole pressed together in a mold under considerable pressure. Blocks may be made of any desired size, and as said before, of any desired color. By using two molds close together, and by forcing into said molds the pulverized and dampened material mixed with different shades of color the effect may be produced of a block made up of different kinds of marble. After the block has firmly set and compacted itself, it may be polished, if desired. It should be particularly noted that I use a very large percentage of Portland cement. In fact the Portland cement constitutes approximately one-half of the whole mixture. Experiments have shown that unless a very large proportion of Portland cement is used, the resulting blocks will be of a quality far inferior to those made in accordance with my invention, crumbling under a comparatively slight pressure and yielding to wear. My artificial marble, however, is exceedingly hard and resists pressure and wear to a considerably greater extent than does the natural marble.

Having thus described my invention, I claim:—

An artificial marble composed of the following ingredients mixed together in substantially the following proportions: Portland cement, 750 parts; marble dust, 125 parts; sand, 450 parts; mineral color, 25 parts; water, 200 parts, substantially as described.

In testimony whereof, I affix my signature, in presence of two witnesses.

JACINTO MITATS.

Witnesses:
B. A. MARTINEZ,
AUG. MATEN.